Figure 1:
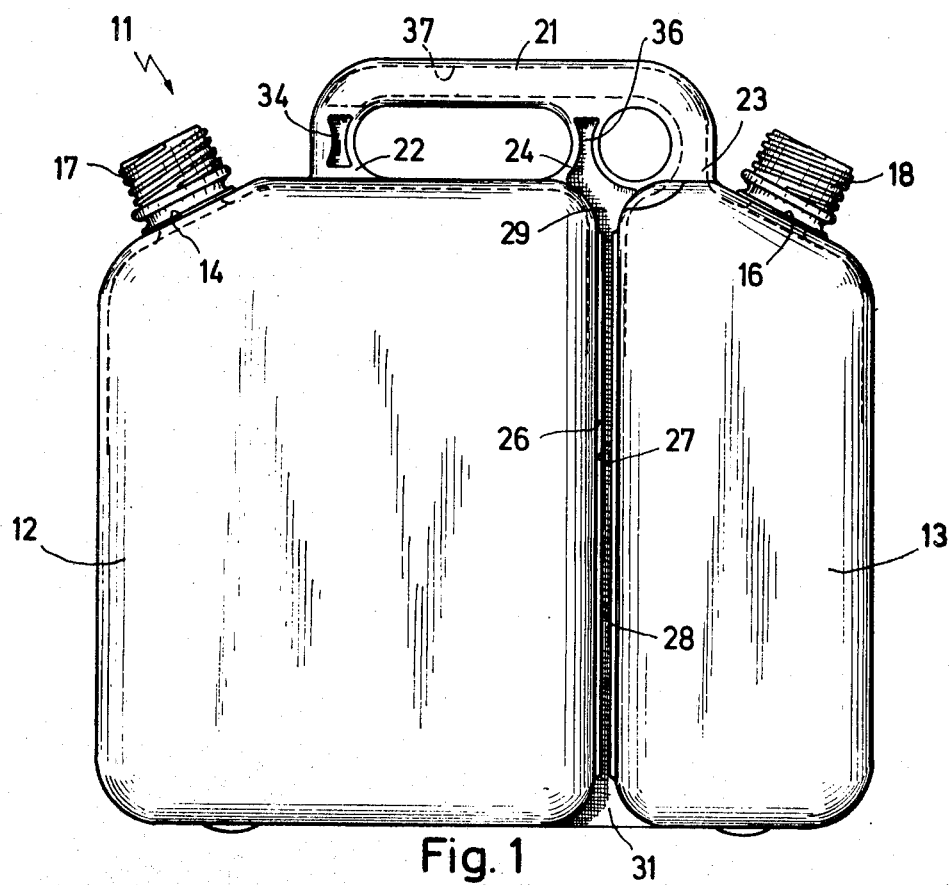

United States Patent [19]
Schiemann

[11] 3,724,987
[45] Apr. 3, 1973

[54] APPARATUS FOR THE BLOWING OF A TWO-COMPARTMENT CAN

[76] Inventor: Wolfram Schiemann, Eugen-Nagele Strasse 17, 714 Ludwigsburg, Germany

[22] Filed: Nov. 12, 1971

[21] Appl. No.: 198,298

[52] U.S. Cl. ..................................425/326, 425/387
[51] Int. Cl. ................................................B29d 23/03
[58] Field of Search..............425/326, 387, 249, 324

[56] References Cited

UNITED STATES PATENTS

| | | | |
|---|---|---|---|
| 2,890,483 | 6/1959 | Soubier | 425/326 X |
| 3,000,050 | 9/1961 | Schaich | 425/326 X |
| 3,172,927 | 3/1965 | Mojonnier | 425/DIG. 58 |
| 3,394,209 | 7/1968 | Cheney | 425/215 X |
| 3,594,865 | 7/1971 | Gilbert | 425/326 X |

FOREIGN PATENTS OR APPLICATIONS

| | | | |
|---|---|---|---|
| 945,578 | 4/1947 | France | 425/249 |

*Primary Examiner*—J. Spencer Overholser
*Assistant Examiner*—Michael O. Sutton
*Attorney*—M. Robert Kestenbaum

[57] ABSTRACT

An apparatus for the blowing of a two-compartment can of the type comprising two compartments, interconnected back-to-back in the area of their walls and facing one another in which there is at least one handle on the top side of the can and one radially inclined spout each on the top side of the compartments. Below an extruder extruding a single tube of hot thermoplastic material and laterally thereto there are provided two blow-mold sections adapted to be moved horizontally toward and away from one another and in closed condition to form the blow mold for the complete can. In each blow-mold section there is a separating wall with interior cooling, the wall corresponding in position and dimension to the slot between the compartments and being spaced in accordance with the thickness of the connecting strip between the compartments. In the plane of junction two inclined spindle sleeves extend in accordance with the bisected apertures for the spouts in the blow-mold sections. The upper portions of the spindle sleeves are, in their position of closest proximity, closer to one another than the inner diameter of the tube and are positioned directly under the lower edge of the tube. The spindle sleeves are adapted to be moved outwardly and upwardly, pulling the extruded tube along, without the thus oppositely placed inner sides of the tube touching one another. The lower edge then extends to a length corresponding to approximately half the circumference of the tube and the upper portions of the spindle sleeves are placed in position for the bisected holes for the spouts and the apparatus in fully closed position of the blow-mold sections is then ready for blowing.

3 Claims, 6 Drawing Figures

PATENTED APR 3 1973 3,724,987

APPARATUS FOR THE BLOWING OF A TWO-COMPARTMENT CAN

This invention relates to an apparatus for the blowing of a two-compartment can, wherein the two compartments being interconnected in back-to-back fashion in the area of their walls facing one another, comprise a handle on the top of the can surface and one spout each on the top surface of the compartments, with the spouts extending in radial direction.

It forms part of the art to combine two compartments forming small individual cans into a single can. Two-compartment cans are convenient for the transportation of two different fluids, for example gasoline and lubricating oil for the preparation of two-stroke mixtures. In cans of the known kind, a large-size snap button is moulded on that side on the first compartment which faces the second compartment. Said snap button is then locked in a corresponding recess in the opposite wall of the second compartment. In order to prevent a rotation of the compartments about the horizontal axis of the snap button, a catch and a reinforcing seam are additionally provided on the walls facing one another. Cans of this kind require two operational steps in their manufacture and then assembly by hand. These cans are insufficient as to their durability, capacity and rigidity. The handle can only be provided on one of the compartments and a shortage of space is encountered when the handle is to be centered on the common point of gravitation of both compartments. Moreover, the handle only reinforces the rigidity of that compartment to which it is affixed.

It is the object of this invention to disclose an apparatus permitting by means of a single operational step the manufacture of two-compartment cans of this kind and their permanent interconnection in a simple and practical fashion with a negligible requirement of material.

According to this invention, this object is achieved in that below an extruder being adapted to extrude a single tube of hot thermoplastic material and laterally to said tube two blow-mould sections are provided which are adapted to be horizontally moved toward and away from one another and which in closed position form the blow mould for the complete can, in that in each blow-mould section a separating wall with interior cooling is provided which in its position and dimension corresponds to the slot between the two compartments and by its surface facing the plane of junction is spaced therefrom in accordance with the thickness of the connecting strip between the compartments, in that in the extension of the plane of junction two spindle sleeves are provided which in accordance with the bisected apertures of the blow-mould sections being provided for the spouts are inclined in the plane of junction, in that the upper portions of the spindle sleeve in their mutually closest spacing extend in greater mutual proximity than the inner diameter of the tube and are disposed directly below the lower edge of the tube, in that the spindle sleeves are adapted to be moved upwardly and outwardly and in the process pull the extruded tube flat without permitting the thus oppositely extending inner surfaces of the tube to touch one another, in that the lower edge then extends at a length corresponding to approximately half of the circumference of the tube and the upper areas of the spindle sleeves correspond in their position to the bi-sected apertures for the spouts and in that with thereupon completely closed blow-mould sections the apparatus is prepared for blowing.

Figure 2:
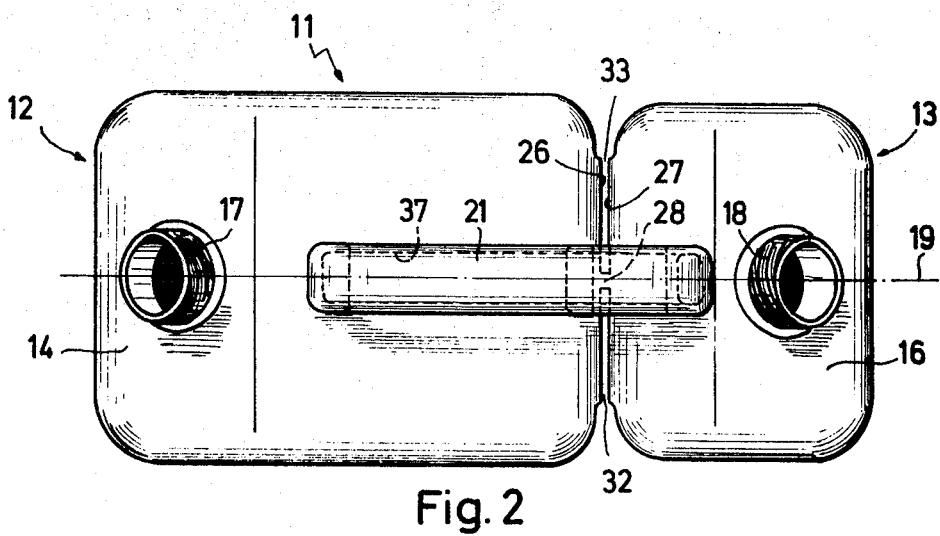
Figure 3:
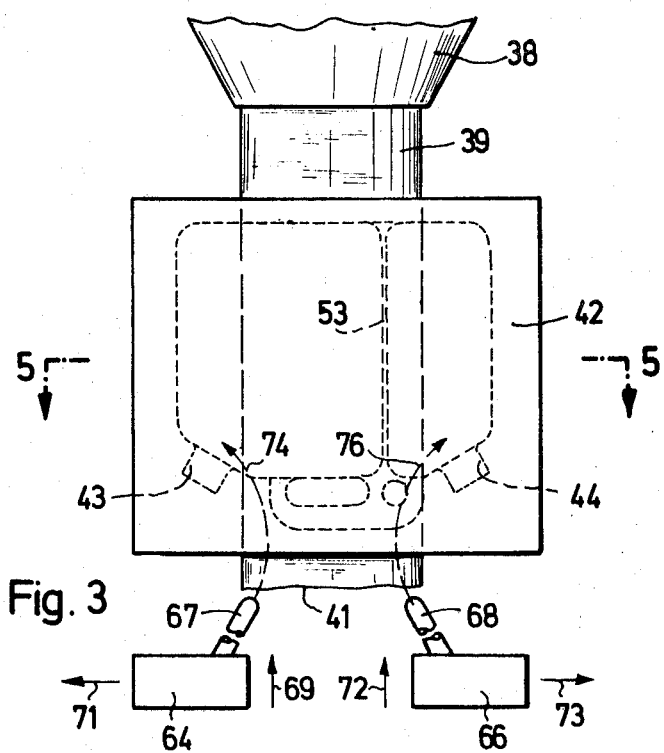
Figure 4:
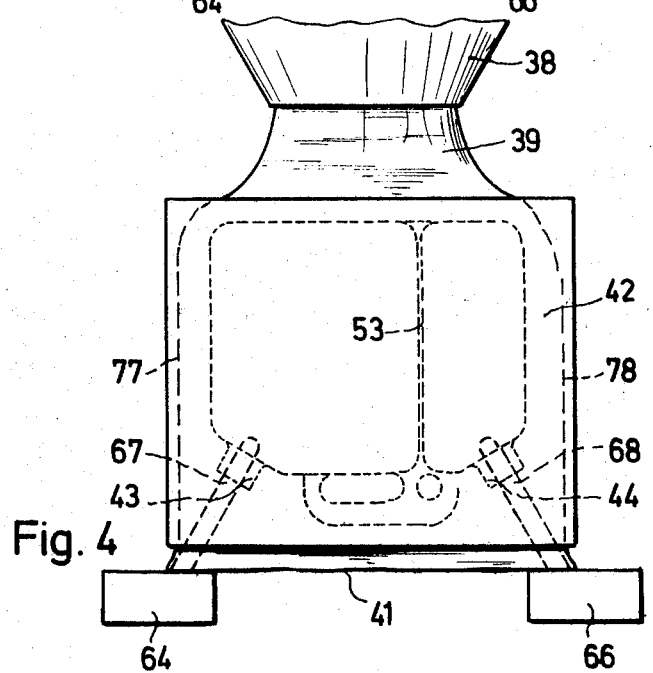
Figure 5:
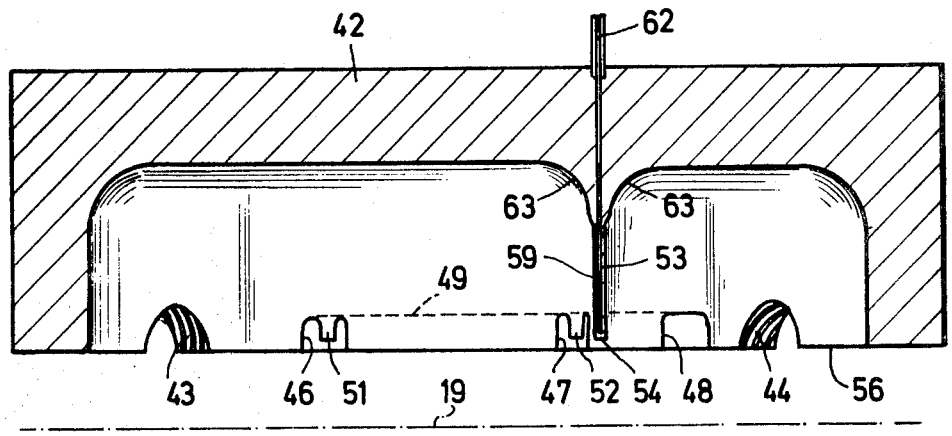
Figure 6:
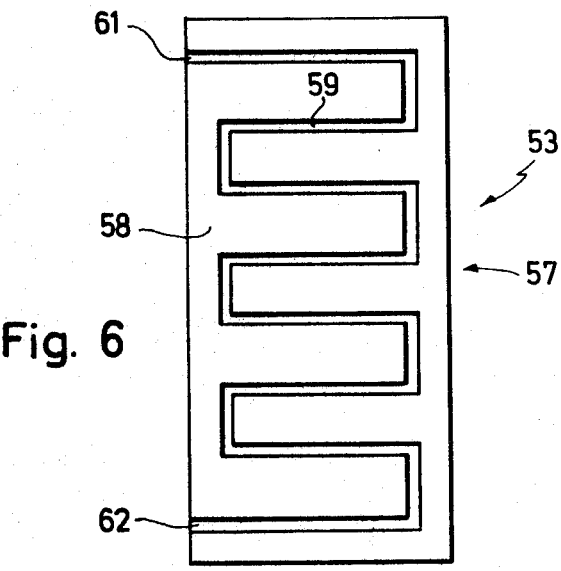

Further advantages and features of this invention may be gathered from the subsequent description of a preferred embodiment, illustrating by the drawing in FIG. 1 a sideview of a completed can, without screw caps, FIG. 2 a plan view of FIG. 1, FIG. 3 a schematic side view of the apparatus after extrusion of the tube, however before closure of the blow-mould sections and upward and outward movement of the spindle sleeves, FIG. 4 a view according to FIG. 3, however with closed blow-mould sections and with the spindle sleeves in their terminal operative positions, FIG. 5 a horizontal cross-section of a section of the blow mould, FIG. 6 one of the sections of a separating wall before fusing to the blow-mould section according to FIG. 5.

Can 11 comprises two compartments 12 and 13, forming substantially rectangular flat bodies. Compartment 12 has a capacity of 5 liters, whereas compartment 13 has a capacity of 2½ liters. Both compartments 12, 13 comprise on their upper surfaces, facing in opposite directions, inclined portions 14, 16 from which threaded spouts 17 and 18 extend. This permits the filling and emptying of compartments 12 and 13 by means of their respective spouts 17, 18. In and symmetrically to plane of junction 19 is provided a handle 21 extending by means of a first root 22 in close proximity to spout 17 into the upper surface of compartment 12, by means of a second root 23 in close proximity to spout 18 into the upper surface of compartment 13 and by means of a third root 24 into compartment 12 as well as into the upper surface of compartment 13. Compartments 12, 13 are attached to one another along their walls 26, 27 by means of a narrow strip 28. Said strip extends at its upper portion 29 into handle root 24 and terminates in its lower portion 31 flush with the lower surface of can 11. Thus there are formed between cans 12, 13 two narrow vertical slots 32, 33 which in the present embodiment are spaced 3 – 4 mm apart and extend to a more than 10-fold depth. These are narrow, large-surfaced slots 32, 33 extending transverse to plane of junction 19.

As revealed by FIG. 1, handle roots 22, 24 are provided with pinch spots 34, 36 so that roots 22, 24 are rendered solid and in handle 21 intersect the otherwise hollow space 37. A handle of this type thus prevents any fluid from spilling from one compartment into the other.

In accordance with FIGS. 3 and 4, an extruder 38 produces a suspended circular hot tube 39 of adequate length. Extruder 38 is conventionally of the stationary type. Lower edge 41 of tube 39 extends to below blow-mould sections 42, being disposed for movement in horizontal and linear manner toward one another, transverse to plane of junction 19, i. e., transverse to the drawing plane of FIGS. 3 and 4, until the mould is closed and away from one another until the mould is opened. The blow-mould sections are with regard to the plane of junction substantially symmetrical so that it will be sufficient to describe only one of them.

Threaded spout 17 is in its lower portion radially inclined and provided with an open-rimmed bisected opening 43 which is threaded on its inner wall. Moreover, there is a bisected threaded opening 44 provided for spout 18 which is inclined in the opposite direction. FIG. 5 also affords a plan view of bisected recesses 46, 47, 48 for handle roots 22, 23, 24. Section 21 of the handle is restricted by means of interrupted line 49. In recess 46, 47 are provided radially extending ribs 51, 52 forming pinch spots 34, 36. In accordance with slot 33 a separating wall 53 extends perpendicular to plane of junction 19 across the full height of blow-mould section 42. Corresponding to half of the thickness of strip 28, face 54 of separating wall 53 does not fully extend to edge 56. Separating wall 53 is made from two plates, plate 57 of which is schematically illustrated in FIG. 6. The plate has a width corresponding to one-half of that of slot 33. In the inner surface of plate 58 a meander-shaped recess 59 is provided which enters plate 57 at inlet 62 and exits at outlet 61. A second mirror-inverted plate is sealingly connected to plate 57 so that recesses 59 of both plates permit the passage of water. Both plates are inserted into blow-mould section 42, fused thereto and provided with the required round-offs 63 by means of application of material. In blow-mould section 42 there are water connections provided which are flush with inlet 62 and outlet 61, respectively so that separating wall 53 can be cooled from the outside. Such a cooling is essential because it prevents upon opening of the blow-mould sections that separating wall 53 sticks to the lateral surfaces of slot 33. In spite of this cooling, those portions of 39 which correspond to strip 28 can be fused completely and seamlessly.

Below edge 41, two moving means 64, 66 are provided which are schematically illustrated in the form of boxes. These moving means may be operated by either pneumatic, hydraulic, mechanical or some other form of power. At any rate, they permit two spindle sleeves 67, 68 being disposed in plane 19 to move in a composite movement according to arrows 69, 71, 72, 73 upwardly as well as outwardly so that spindle sleeves 67, 68 are moved in similar paths in opposite directions and their tips describe arcuate movements according to arrows 74, 76, as shown in interrupted line. Spindle sleeves 67, 68 engage in their upward and outward movement the edge of the initially circularly hanging tube 39 and move it outwardly, as shown in FIG. 4. Edge 41 is thereby either not at all or only slightly stretched and, as may be seen from substantially perpendicular restricting lines 77, 78, tube 39 is held by spindle sleeves 67, 68 at a sufficient width. Due to the diameter of spindle sleeves 67, 68 the oppositely disposed portions of the inner walls of tube 39 are not in contact with one another as they would otherwise stick together. When blow mould sections 42 are in closed position, the blowing process is started. Blowing is conducted at approximately 10 atm. and the two compartments 12, 13 are formed. Spindle sleeves 67, 68 form the inner mandrel for threaded spouts 17, 18. Due to the fact that the pressure in both compartments 12, 13 is the same, strip 28 is deflected neither into compartment 12 nor into compartment 13. Minor differences in pressure have practically no effect as strip 28 is a narrow one. A certain amount of excess pressure in compartment 12 would not push the material in the area of strip 28 into compartment 13, because due to its viscosity and the small space between faces 54 it would not flow toward compartment 13. The pressure prevailing in compartment 13 also forms the hollow space in handle 21. It would be feasible to pinch all of the handle by means of extending ribs 51, 52 so that there is no hollow space left.

Upon a cooling period, spindle sleeves 67, 68 are extended in the direction of threaded spouts 17, 18 while blow-mould sections 42 remain closed. When blow-mould section 42 is opened, the can blank is ejected and falls out, whereupon spindle sleeves 67, 68 return to their position, as illustrated in FIG. 3.

What is claimed is:

1. An apparatus for the blowing of a two-compartment can, wherein the two compartments are interconnected back-to-back in the area of their walls facing one another, having at least one handle on the top side of the can and one radially inclined spout each on the top side of the compartments comprising two blow-mold sections provided below an extruder extruding a single tube of hot thermoplastic material and laterally thereto, the two blow-mold sections being adapted to be moved horizontally towards and away from one another and in closed condition to form the blow-mold for the complete can, a separating wall with interior cooling provided in each blow-mold section, said wall corresponding in position and dimension to the slot between the compartments and being spaced in accordance with the thickness of the connecting strip between the compartments, two spindle sleeves provided at an inclination in the junction plane of the blow-mold sections, extending in accordance with the bisected apertures for the spouts in the blow-mold sections, the upper portions of the spindle sleeves in their position of closest proximity being closer to one another than the inner diameter of the hot thermoplastic material extruded tube and positioned directly under the lower edge of the extruded tube of hot plastic material, means for moving the spindle sleeves outwardly and upwardly, thereby pulling the extruded tube along, without the thus oppositely placed inner sides of the extruded tube touching one another, the lower edge of the extruded tube extending to a length corresponding to approximately half the circumference thereof, the upper portions of the spindle sleeves being adapted to be placed in position for the bisected holes for the spouts, the apparatus in fully closed position of the blow-mold sections then being ready for blowing.

2. An apparatus according to claim 1, in which bisected recesses are provided in the blow-mold sections for a centered handle which extend from the recess in one compartment to the recess in the other compartment and in the area of at least one of the handle roots a rib is provided in the bisected recess, the cross-section of which displaces the interior space of the centered handle and renders the root solid.

3. An apparatus according to claim 2, in which the bisected recesses for the handle roots are provided on both sides of the separating wall.

* * * * *